(No Model.) 4 Sheets—Sheet 1.

L. P. COTA & I. L. EDWARDS.
FARM GATE.

No. 572,473. Patented Dec. 1, 1896.

Witnesses:
Frank P. Prindle
Henry E. Hazard

Inventors:
Louis P. Cota and Isaac L. Edwards,
By Prindle and Russell, their Attys.

(No Model.) 4 Sheets—Sheet 2.

L. P. COTA & I. L. EDWARDS.
FARM GATE.

No. 572,473. Patented Dec. 1, 1896.

Witnesses
Frank P. Prindle
Henry C. Hazard

Inventors
Louis P. Cota and Isaac L. Edwards
By Prindle and Russell, their Attys

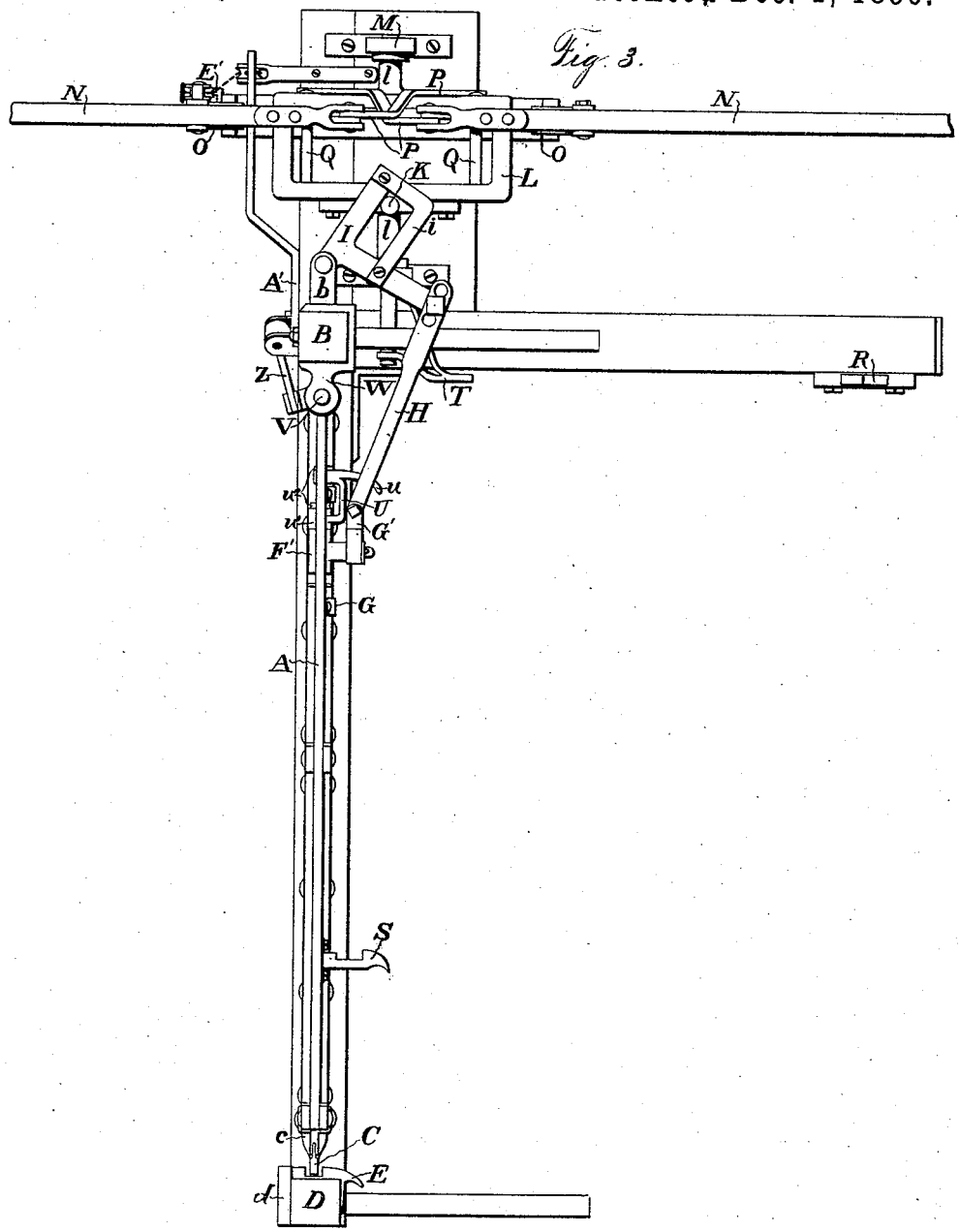

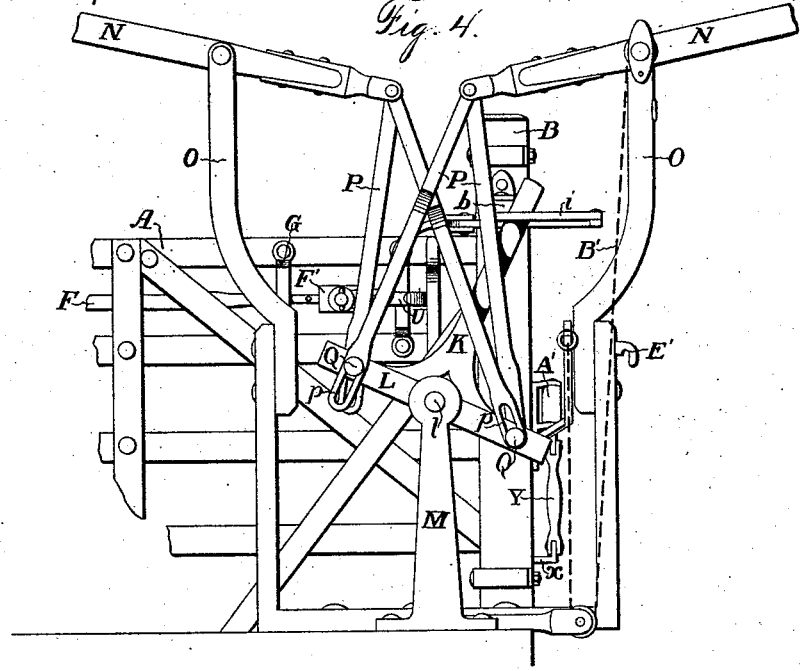
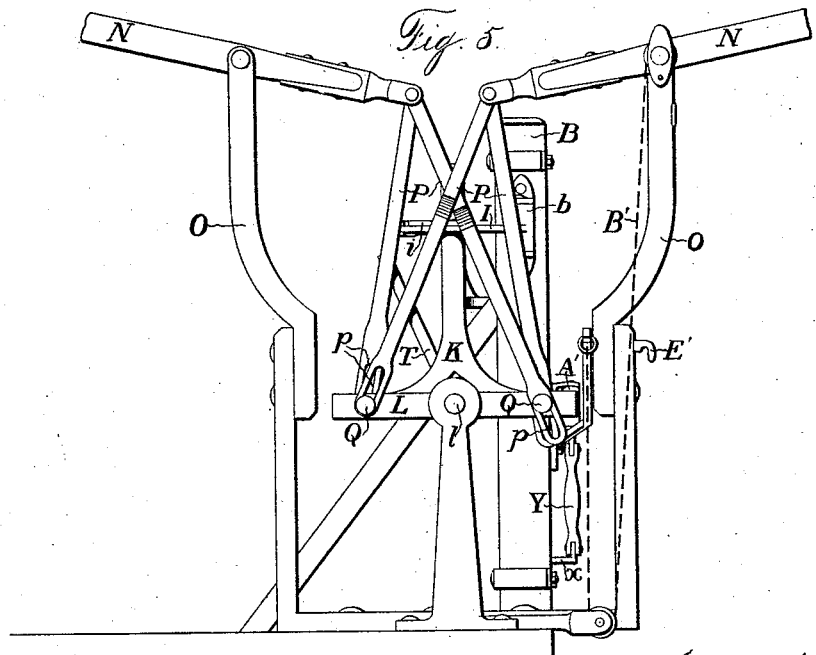

UNITED STATES PATENT OFFICE.

LOUIS P. COTA AND ISAAC L. EDWARDS, OF AURORA, ILLINOIS.

FARM-GATE.

SPECIFICATION forming part of Letters Patent No. 572,473, dated December 1, 1896.

Application filed August 13, 1895. Serial No. 559,131. (No model.)

*To all whom it may concern:*

Be it known that we, LOUIS P. COTA and ISAAC L. EDWARDS, of Aurora, in the county of Kane, and in the State of Illinois, have invented certain new and useful Improvements in Farm-Gates; and we do hereby declare that the following is a full, clear, and exact description thereof, reference being had to the accompanying drawings, in which—

Figure 1:
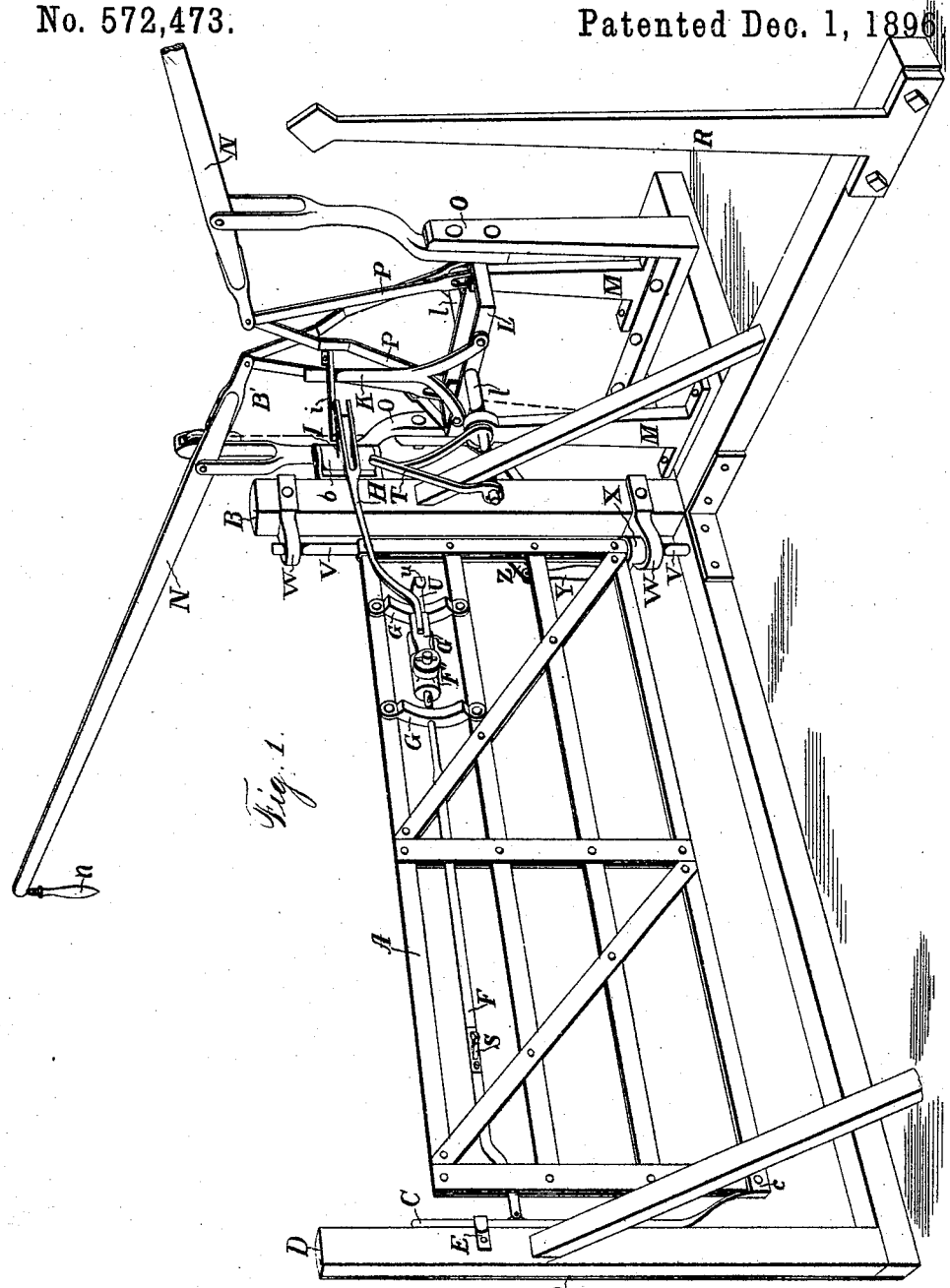
Figure 2:
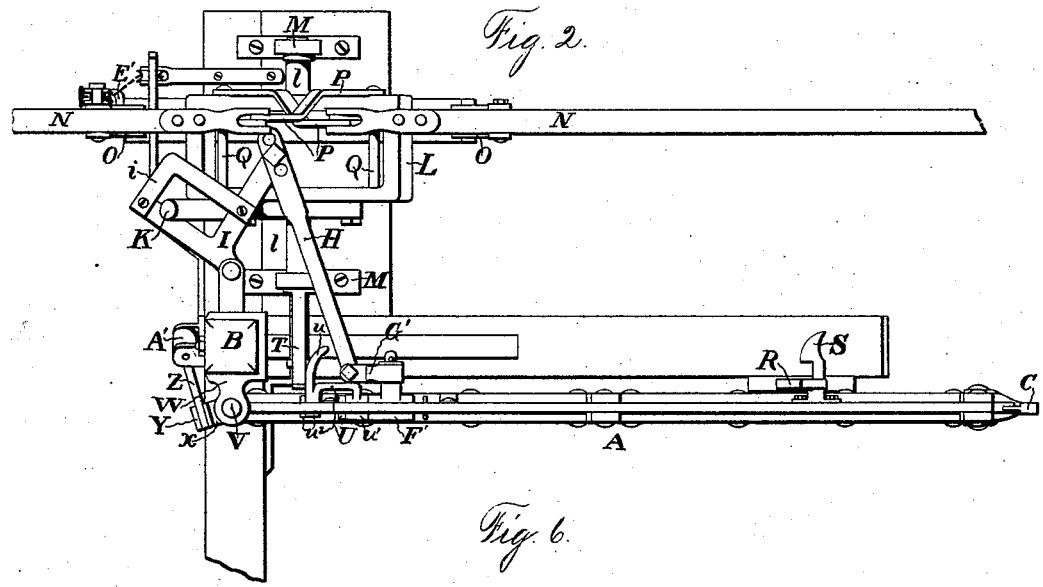
Figure 6:
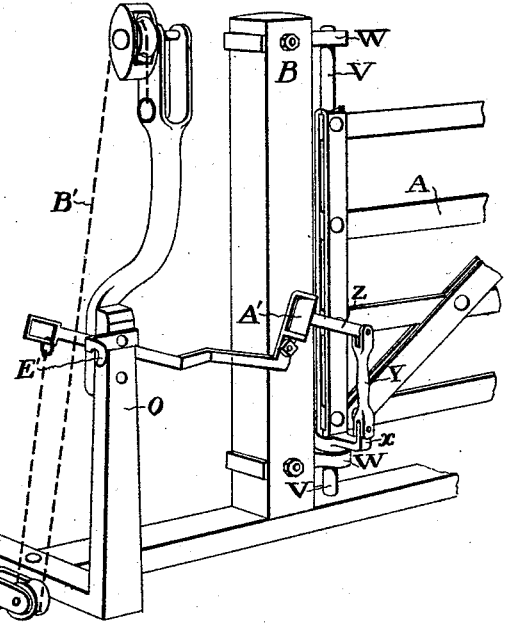

Figure 1 is a perspective view of a gate embodying our invention. Figs. 2 and 3 are plan views of a portion of the same, showing, respectively, the position of parts when the gate is opened and closed. Figs. 4 and 5 are side views of a portion of the operating mechanism, showing, respectively, the position of parts when the gate is open and closed; and Fig. 6 is a detail perspective view of the gate-raising mechanism.

Letters of like name and kind refer to like parts in the several figures.

The object of our invention is to provide an efficient and easily-operated mechanism for opening and closing farm-gates and for the vertical adjustment of the same; and to these ends said invention consists in the mechanism having the construction substantially as hereinafter described.

In the carrying of our invention into practice any desired construction of swinging gate A may be employed, that shown being of usual form, pivoted or hinged to a suitable post or upright B in the manner hereinafter appearing and designed always to swing on the same side of the gateway. Said gate is provided with a latch in the form of a vertical bar C, that is carried by a spring-plate c, bolted to the gate near its bottom, which upon one side engages a vertical rib d upon one side of the latch-post D and upon the other side a catch E, of usual construction for cooperation with a spring-latch. Near its upper end the latch-bar C is connected to a horizontal rod or bar F, that at its inner end is supported and guided by two vertical plates or bars G and G, attached to the gate-bars. Connected to said rod near its inner end by a link H is a horizontally-swinging lever I, pivoted to a bracket b, bolted to the post B.

The lever I has an arm i, provided with an elongated opening or slot through which projects the upper end of a vertical bar K, secured at its lower end to a vertically-swinging frame L, which is journaled by horizontal shafts or pivots l and l upon its opposite sides in bearings upon the upper ends of two posts M and M, suitably fastened to the ground. The swinging of the frame L first operates to disengage the latch-bar C and then to move the gate, and movement may be given it for this purpose from either side of approach by means of two levers N and N, pivoted, respectively, upon opposite sides of the gate to standards O and O. Each lever N is designed both to open and to close the gate, and for this purpose each is connected by two bars or links P and P with said frame L upon opposite sides of the pivot thereof, so as to be able to swing the frame both up and down by a downward pull upon a pendent handle n, attached to the lever upon the side of its pivot opposite that to which the links P and P are connected.

It is of course apparent that both links of each lever must move upward upon such downward pull of the lever, and hence to prevent each opposing the other and holding the frame from moving the connection between the frame and each link is made by a pin Q, attached to the frame, and a slot p in the link, and the slots of the two links are located such relative distances from the point of connection of the links with the lever P that when one link engages its pin Q there will be a space between the pin Q of the other link and the portion of the latter that must engage the same to cause the frame to be actuated.

Of course the employment of the two links as described precludes moving the gate through the entire distance of its travel by a continuous pull upon the lever, but a continuous pull is not necessary, as the gate having been started by a short sudden jerk upon the lever will have momentum enough to finish its movement. But little and short effort is thus necessary to actuate the gate.

To stop the gate when it has been opened to the desired extent, a standard R is placed in line with the hinge-post B in such position as to be struck by the gate, and as it is desirable to latch the gate when opened the latch-rod F is provided with a catch S to engage said standard.

To effect the release of the gate when thus latched in an open position, the pivot-shaft of the frame L is provided with a radial arm T, that is adapted to engage a horizontal bar U upon the inner end of the latch-rod F, and thereby move said rod longitudinally and remove the catch S from engagement with the standard R. The bar U is secured to the latch-rod by having a cavity in its side, into which the end of said rod is inserted, and by means of an L-shaped extension $u$, having an eye $u'$, through which the rod is passed and which is engaged on opposite sides by nuts $u^2$ and $u^2$ upon the rod. By the construction described a limited adjustment of the bar U is provided for.

To enable our gate to be adjusted vertically to prevent interference with its operation by snow, the hinges we employ consist of comparatively long vertical pintles V and V, projecting, respectively, from the top and bottom of the gate, each of which is journaled on a perforated plate or eye W, bolted to the post B. The two eyes W and W are such a distance apart as to permit all required vertical movement of the gate.

The lower pintle V passes through a collar X, upon which the lower edge of the gate rests, which collar has an arm $x$, to which is connected the lower end of a link Y, whose upper end is attached to a horizontal bar Z, pivoted to one arm of a bell-crank lever A, that is pivoted to the post B. To the other arm of said bell-crank lever is connected one end of a chain B', that thence passes downward to and around a pulley C' and thence upward to and over a second pulley D', journaled in a bracket attached to one of the standards O. By pulling downward upon the free end of the chain B' the gate may be raised, and by securing the chain, as by attaching it to a hook or projection E' on the standard O, may be held at the desired point. To lower the gate, it is necessary simply to release the chain and permit the gate to descend by gravity.

As the gate is vertically movable, it is necessary to connect the operating mechanism to it so as to permit the same to work freely at all points in the vertical adjustment of the gate, and this we do by pivoting upon the latch-rod F an arm F", to which in turn is pivoted at right angles a short bar G', that is pivotally connected with the link or bar H.

The operation of our gate is as follows: The gate being closed, to open it it is necessary simply to give a short pull or jerk downward upon one of the levers N. This will swing the frame L and, through the bar K and lever I, first disengage the latch-bar from the latch-post and then swing the gate open. Movement of the lever N must continue only long enough to thus release and start the gate, the momentum imparted to the latter being sufficient to cause it to swing completely open until the catch hooks over the stop-standard R. Upon passing through the gate the other lever, N, is pulled, which acts to swing the frame in the reverse direction and, first releasing the catch S, starts the gate in its closing movement.

Having thus described our invention, what we claim is—

1. The combination of the gate, the pivoted frame or part, connections between it and the gate, an operating-lever, and a connection between the latter and the frame on each side of the pivot thereof, adapted to allow movement of the frame, independent of the lever, after being started by the latter, whereby said lever, by alternate action on said connections, may open and close the gate, substantially as and for the purpose specified.

2. The combination of the gate, the swinging frame or part connected therewith, the operating-lever, and the two bars having slotted connections with said part on opposite sides of its center, substantially as and for the purpose set forth.

3. The combination of the swinging gate, the lever connected therewith having a slotted arm, the swinging frame or part having an arm engaging said slotted arm, the two operating-levers, and the two bars extending between each lever and the swinging part, having slotted connections with the latter upon opposite sides of its pivot, substantially as and for the purpose shown.

In testimony that we claim the foregoing we have hereunto set our hands this 23d day of July, 1895.

LOUIS P. COTA.
ISAAC L. EDWARDS.

Witnesses:
ROSWELL W. GATES,
EDWARD T. PRINDLE.